July 27, 1926.

F. E. RICKETTS 1,594,117

ELECTRICAL PROTECTIVE DEVICE

Filed July 22, 1921

WITNESSES:
A. G. Schiefelbein
J. C. Foster

INVENTOR
Forrest E. Ricketts
BY
ATTORNEY

Patented July 27, 1926.

1,594,117

UNITED STATES PATENT OFFICE.

FORREST E. RICKETTS, OF CATONSVILLE, MARYLAND.

ELECTRICAL PROTECTIVE DEVICE.

Application filed July 22, 1921. Serial No. 486,669.

My invention relates to electrical protective devices and particularly to relays.

One object of my invention is to provide a relay for selectively protecting parallel-connected conductors.

A further object of my invention is to provide a suitable reverse relay that shall be actuated in the one or the other direction only when the circuits to which it is connected become unbalanced.

My co-pending application, Serial No. 317,651, electrical protective devices, filed August 15, 1919, of which my present application is a continuation in part, discloses an electrical system comprising parallel-connected conductors and a balance relay for protecting the same in accordance with the current traversing the conductors.

In the application mentioned above, a plurality of parallel-connected feeder conductors are severally provided with overload relays that serve to protect the conductors from abnormal currents.

In addition to the overload relays, I provide a balance relay that is actuated and controlled in accordance with a predetermined ratio between the values of the currents traversing the several conductors. So long as the currents that traverse the conductors maintain a predetermined ratio, thus indicating normal conditions, the balance relay remains inoperative.

Upon the occurence of abnormal conditions, however, an unbalance occurs that serves so to actuate the balance relay as to effect the disconnection of the faulty feeder which has caused the unbalance.

Figure 1:
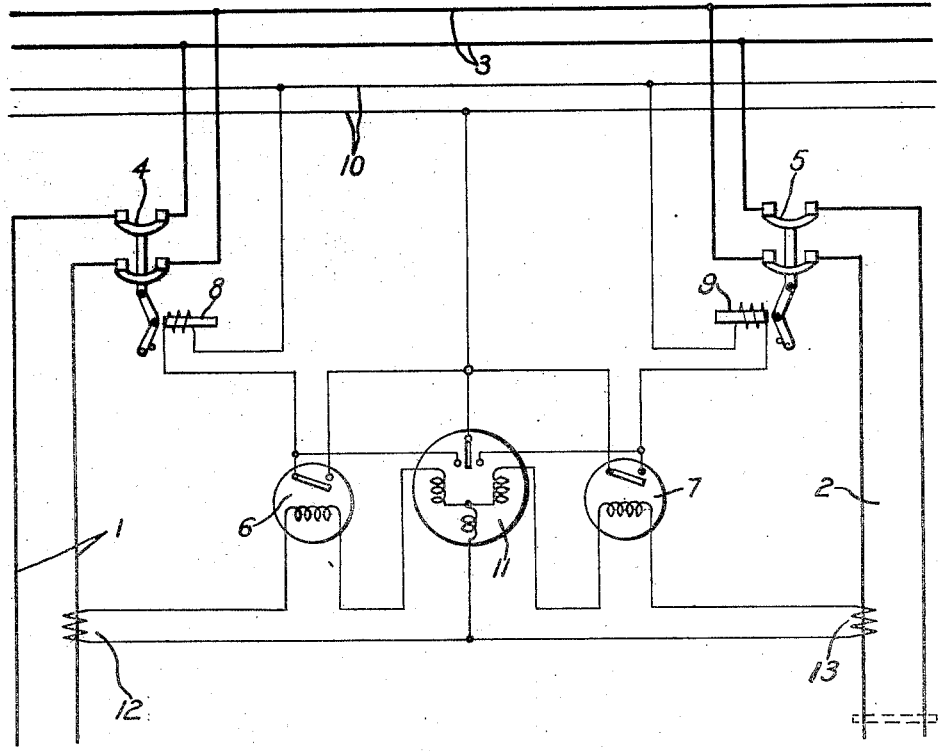
Figure 1 is a diagrammatic view of an electrical distributing system.

Referring to Fig. 1, energy is supplied to a plurality of parallel-connected conductors 1 and 2 from a supply circuit 3 through circuit interrupters 4 and 5, respectively. The conductors 1 and 2 are respectively provided with overload relays 6 and 7 to effect protection thereof against abnormal currents.

The interrupters 4 and 5 are respectively provided with tripping mechanisms 8 and 9 to effect the disconnection of the corresponding circuits 1 and 2 upon the occurence of abnormal overloads. Energy for actuating the tripping mechanisms 8 and 9 is derived from a control circuit 10.

In addition to the overload relays 6 and 7 that serve to protect the circuits 1 and 2 against abnormal currents, I provide a balance relay 11 that effects the disconnection of either cicuit 1 or circuit 2 upon the occurrence of a fault thereon that serves to unbalance the currents traversing the two circuits.

The overload relay 6 is energized from the circuit 1 through a current transformer 12, and the overload relay 7 is energized from the circuit 2 through a current transformer 13. The relay 11 is so connected to the circuit, including both current transformers 12 and 13, as to be energized in accordance with the balance between the currents traversing both transformers.

Figure 2:
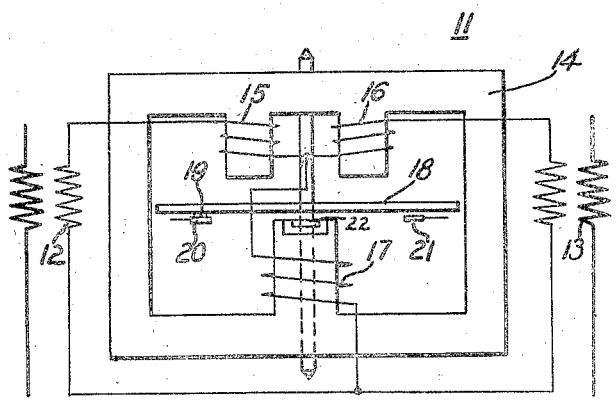
Fig. 2 is a diagrammatic view of a relay embodying my invention.

Referring now to Fig. 2, where the balance relay 11 is shown more in detail, the balance relay comprises a magnetizable core member 14, two windings 15 and 16, that are conneccted in series with the windings of the relays 6 and 7 and the current transformers 12 and 13, and a winding 17 that is connected between the junction of the windings 15 and 16 and the junction of the current transformers 12 and 13. A short-circuited winding 22 is provided for effecting a shifting in the phase relation of the fluxes induced by the currents traversing the windings 15, 16 and 17.

The windings 15 and 16 are traversed by the currents that traverse the secondary windings of the current transformers 12 and 13, respectively, and, with the connections as indicated, the winding 17 is traversed by the sum of such currents. So long as the current values are balanced, indicating normal conditions, the torque produced by the windings 15 and 17 is counterbalanced by the torque produced by the windings 16 and 17.

Upon the occurence of unbalanced conditions, however, such as might be caused by a fault on the circuit 2, an increased value of current traverses the windings 16 and 17, and the increased torque developed by the windings 16 and 17 exceeds the torque developed by the windings 15 and 17, and the travelling magnetic field traversing the disc armature member 18 is in such a direction as to effect engagement between a movable contact member 19 and a stationary contact member 20.

Similarly, an unbalance caused by excessive currents in the circuit 1 would produce a travelling magnetic field in the opposite direction traversing the armature to effect the engagement of contact member 19 and a contact member 21.

Upon the engagement of the contact members 19 and 20, the tripping mechanism 9 is energized, and the interrupter 5 is actuated to disconnect the faulty feeder circuit 2 from the supply circuit 3.

With my invention, selective operation in the disconnection of parallel-connected feeder conductors is obtained without the use of potential relays and, consequently, without the use of potential transformers.

My invention is not limited to the specific arrangement of the various elements that are illustrated but may be modified without departing from the spirit and scope of my invention, as set forth in the appended claims.

I claim as my invention:

1. A relay comprising a conducting armature member, two windings cooperating therewith, terminals for said windings, another terminal and a third winding cooperating with the first-mentioned windings and connected between said windings and said other terminal, said windings being so arranged as to set up travelling fields in the one or the other direction traversing said armature member depending upon the relative magnitudes of the currents traversing said windings.

2. A directional relay comprising a magnetizable core member, a plurality of windings for energizing the core member, a disc member movable in two directions and a third winding connected to and co-operating with the other windings to control the direction of movement of the disc member.

3. A directional relay comprising a magnetizable core member, a plurality of windings each having a circuit terminal for energizing the core member, a disc member movable in two directions by eddy currents induced therein and a third winding so electrically associated with the other windings as to induce eddy currents in the movable disc member of such character to control the direction of movement thereof.

4. A directional relay comprising a magnetizable core member, a plurality of windings each having a circuit terminal for energizing the core member, a disc member movable in two directions by eddy currents induced therein and means comprising a third winding disposed on the core member and cooperating with the said windings to produce moving flux fields to actuate the disc member.

5. A directional relay comprising a magnetizable core member, a plurality of windings each having a circuit terminal for energizing the core member, an armature member movable in two directions by eddy currents induced therein and means comprising a third winding energized through and co-operating with the other windings to produce moving flux fields to actuate the armature member.

6. A directional relay of the induction type comprising a magnetizable core member, a movable disc member and means for controlling the movement thereof comprising means for energizing a portion of the core member in accordance with the sum of the values of the current traversing two external circuits, means for energizing another portion of the core member in accordance with the value of one of said currents, and closed-circuited means for producing fluxes derived from, and angularly disposed relative to, the fluxes established by the aforementioned energizing means.

7. A directional relay of the differential type comprising a movable disc member, two energizing elements having separate circuit terminals for energizing the disc member and a third element energized through the aforementioned two elements for controlling the movement of the disc member by producing magnetic fields moving in a direction depending upon the relative values of the currents traversing the several elements.

8. A directional relay of the induction type comprising a movable disc member, means for establishing a torque in one direction in the disc member in accordance with a predetermined electrical characteristic of an electric circuit, means for establishing a torque in another direction in the disc member in accordance with a predetermined electrical characteristic of a second electric circuit, and means energized through said means and in accordance with a function of the degrees of energization of said means for co-operating therewith to establish a moving torque in the disc member under predetermined degrees of relative energization in the first-mentioned means.

9. An electric relay comprising a movable circuit-controlling armature member, contact members to be controlled by said member when moved in either direction, two series connected windings and one shunt connected winding, the series connected windings serving to retain the movable member in balanced position while the currents traversing the same are equal, and the shunt winding co-operating with one of the series windings to effect movement of the movable member in a direction corresponding to the series winding which is energized to a greater degree.

10. A balance relay of the induction type comprising a magnetizable core member, a movable disc subject to the influence thereof, two windings for energizing the core member, circuit terminals therefor and a third winding dependent upon the current traversing one of the aforementioned windings for its energization and disposed on the core member to co-operate with one of said windings to produce moving magnetic fields to actuate the disc member.

11. A differential relay of the induction type comprising a magnetizable core member, a movable armature member subject to the influence thereof, two windings for energizing the core member to establish normally counterbalancing effects and means comprising a third winding dependent for its energization upon the current traversing said windings for producing an effect co-operating with that produced by one of said windings to establish a moving magnetic flux to actuate the armature member.

12. A relay of the induction type comprising a plurality of magnetically coacting members having windings thereon adapted to be energized from separate sources and means cooperating with said members and energized from said windings for producing a travelling magnetic field in either of two directions.

13. A relay of the induction type comprising two magnetically coacting members having windings thereon adapted to be energized from separate sources and means including a third winding cooperating with said members and energized from the first-mentioned windings for producing a travelling magnetic field in a direction determined by the relative energization of the first-mentioned windings.

14. A relay of the induction type comprising two magnetically coacting members having windings thereon adapted to be energized from separate sources and a third winding connected to both said first-mentioned windings and so arranged with respect to said members as to produce a travelling magnetic field in a direction determined by the relative energization of the first-mentioned windings.

In testimony whereof, I have hereunto subscribed my name this 12th day of July 1921.

FORREST E. RICKETTS.